(12) United States Patent  
Durin

(10) Patent No.: US 6,401,939 B1  
(45) Date of Patent: Jun. 11, 2002

(54) WIRE CABLE RACK EQUIPPED WITH AT LEAST ONE FIXING ACCESSORY, AND CORRESPONDING FIXING ACCESSORY

(75) Inventor: Michel Durin, Saint Cyr l'Ecole (FR)

(73) Assignee: Metal Deploye S.A., Montbard (FR)

( * ) Notice: Subject to any disclaimer, the term of this patent is extended or adjusted under 35 U.S.C. 154(b) by 0 days.

(21) Appl. No.: 09/463,760

(22) PCT Filed: Jun. 26, 1998

(86) PCT No.: PCT/FR98/01367

§ 371 (c)(1),
(2), (4) Date: Feb. 1, 2000

(87) PCT Pub. No.: WO99/06746

PCT Pub. Date: Feb. 11, 1999

(30) Foreign Application Priority Data

Aug. 1, 1997 (FR) .............................. 97 09863

(51) Int. Cl.[7] .................................. F16L 3/22
(52) U.S. Cl. .......................... 211/26; 248/68.1
(58) Field of Search ................ 211/26, 181.1; 248/68.1

(56) References Cited

U.S. PATENT DOCUMENTS

D322,596 S  * 12/1991  Henneberger ............... D13/155
D323,756 S  *  2/1992  Simpson ..................... D6/571
5,384,937 A *  1/1995  Simon ................. 211/181.1 X
5,534,665 A *  7/1996  Long ....................... 248/68.1 X
5,899,041 A *  5/1999  Durin ................. 211/181.1 X
6,023,024 A *  2/2000  Stjerneby ................ 211/184 X
6,082,690 A *  7/2000  Durin et al. .......... 211/90.01 X
6,138,961 A * 10/2000  Zweig ....................... 248/68.1

FOREIGN PATENT DOCUMENTS

| DE | 1 590 128 | 4/1970 |
| FR | 1 183 562 | 7/1959 |
| FR | 2 727 186 | 5/1996 |
| GB | 1581 552 | 12/1980 |

* cited by examiner

Primary Examiner—Daniel P. Stodola  
Assistant Examiner—Erica B Harris  
(74) Attorney, Agent, or Firm—Young & Thompson

(57) ABSTRACT

The invention concerns a wire cable rack (10) for supporting and fixing electric cables (16), locally equipped with at least a fixing accessory (18), including fastening means (20, 21) through which it is made integral with the wire cable rack (10) panel which is equipped therewith, and with at least a hole (22, 23) which runs right through it, and by which it can receive any fixing element, such as a clamp fitting (17), bolt or the like.

17 Claims, 3 Drawing Sheets

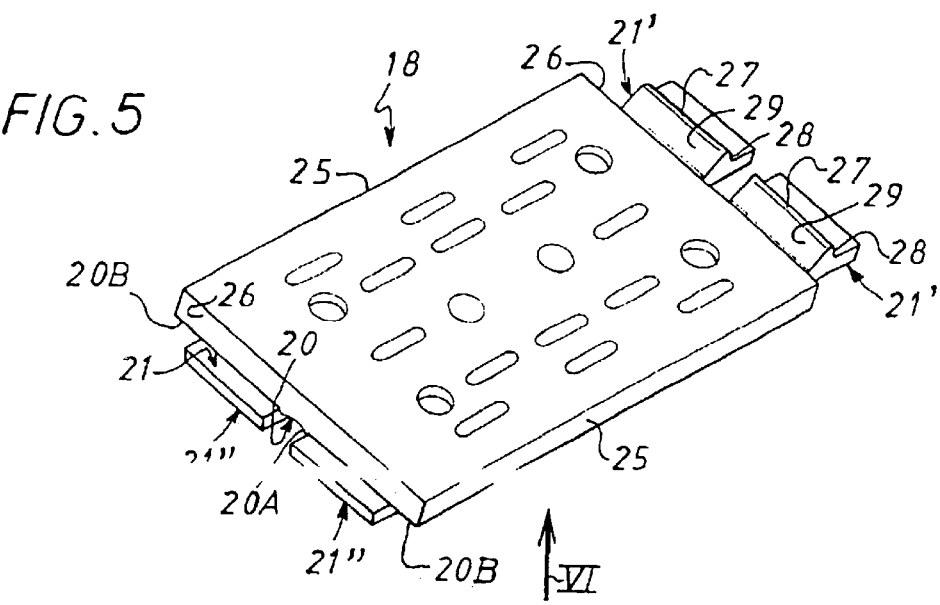
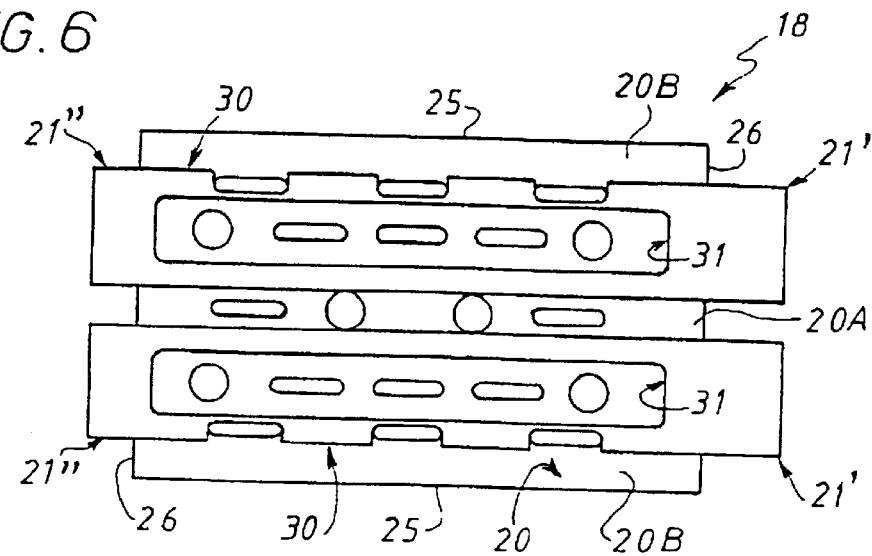
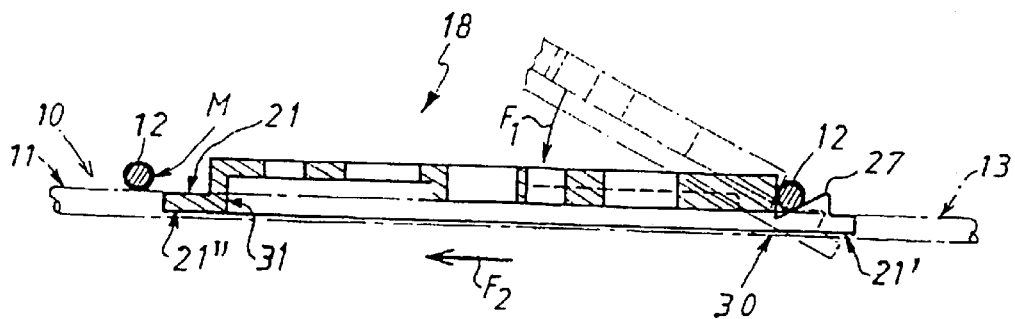

WIRE CABLE RACK EQUIPPED WITH AT LEAST ONE FIXING ACCESSORY, AND CORRESPONDING FIXING ACCESSORY

The present invention relates generally to wire cable racks.

Wire cable racks well known in the art include a mesh made up of wires of two different types, on the one hand longitudinal wires, commonly called warp wires, which run longitudinally and in a rectilinear or quasi-rectilinear manner throughout their length and, on the other hand, spaced along the longitudinal wires and appropriately attached thereto, U-shaped transverse wires, commonly referred to as weft wires, the combination globally forming three panels, which are in practice plane or substantially plane, namely a bottom panel and two side panels, commonly referred to as flanges.

These wire cable racks are routinely used, in the manner of trunking, to support, house and protect electric cables or the like.

The expression "electric cables" as used herein means not only cables for transporting and distributing electric energy, but also cables and fibers for transmitting information electrically, optically or otherwise.

With reference to such electric cables, wire cable racks have many advantages appreciated by electric installers, and in particular the advantages of easy installation, and therefore of economy, of flexibility, because the electric cables can be drawn out through any mesh, of transparency, and therefore of easy identification of the electric cables, of insulation, of cleanliness, of safety, both of the electric cables themselves and of users, and of performance.

However, at present, the fixing of the electric cables to one of the panels, which is necessary to hold the electric cables in place, and which is done in practice using cable ties looped transversely around one of their longitudinal wires and gripping one or more of the electric cables, is not always totally satisfactory.

One reason for this is that the wires necessarily cross over at different levels, the longitudinal wires being in practice outside the transverse wires.

As a result, if they are not stiff enough, the electric cables espouse the corresponding changes in level.

The electric cables are therefore often seen to be subject to an undulating deformation, especially in the case of electric cables of relatively small diameter.

Apart from the fact that this undulating deformation can sometimes be deemed to be unesthetic, it can also compromise the service life of the electric cables and/or the quality of their performance.

This is particularly so in the case of electric cables with capillary internal wiring suitable for networks interconnecting data processing equipment, in which the diameter of the electric conductors is no more than a few tenths of a millimeter.

Furthermore, regardless of the nature and/or the diameter of the electric cables, the cable ties which hold them in place can unintentionally move along the longitudinal wire that they pass around with the result that in the final analysis the retention of the electric cables in place is not totally controlled.

The general object of the present invention is an arrangement which avoids these drawbacks and which has other advantages.

To be more precise, the present invention consists of a wire cable rack of the kind including meshed wires of two different types, namely, longitudinal wires which run longitudinally throughout its length and, spaced along the longitudinal wires and appropriately attached thereto, U-shaped transverse wires. The combination globally forming, in the manner of trunking, three panels, namely a bottom panel and two side panels. This wire cable rack being generally characterized in that it is locally equipped on any of its panels with at least one accessory, referred to hereinafter as a fixing accessory, including, attachment means by which it is attached to the panel to which it is fitted and, at least one hole which passes completely through it and which is adapted to receive a fixing member of any kind, such as a cable tie or a bolt. It also consists of the corresponding fixing accessory, in isolation.

A first advantage of the fixing accessory in accordance with the invention used in this way is that it provides a seating for the electric cables, at any location chosen by the installer, which is more extensive than that provided by a mere wire.

The fixing accessory in accordance with the invention is preferably in the general form of a plate and the seating that it offers the electric cables is therefore advantageously plane.

It preferably has a thickness at most equal to that of the wires of the cable rack so that whether it straddles one of the longitudinal wires, and more generally one of the outside wires, or is inserted into one of the meshes that the latter form with the transverse wires, and more generally with the inside wires, its free surface is level with the generatrix of the inside wires at the greatest distance from the outside wires, with no change of level therewith.

Thus undulating deformation of the electric cables between their successive supports is advantageously avoided.

The fixing accessory in accordance with the invention preferably also has, in a cruciform arrangement adapted to constitute its attachment means, a first attachment surface, which bears on at least one outside wire and a second attachment surface, which faces toward the first attachment surface and which is engaged under at least two inside wires.

Accordingly, the fixing accessory in accordance with the invention is simply clipped to the wire cable rack to which it is fitted, gripping the wires of the cable rack of its own accord, without the intervention of any other auxiliary fixing means or device.

The fixing accessory is also advantageously removable, enabling it to be taken off and recovered, if required.

The fixing accessory, in conjunction with the invention, and through it the fixing member(s) it receives, are advantageously locked in position on the wire cable rack to which the accessory is fitted both transversely and longitudinally.

In particular, because of this fixing accessory, the cable ties used to hold the electric cables in place are advantageously locked longitudinally in position on the wire cable rack, which has the benefit of better controlled and long-term retention of the electric cables in position.

However, over and above the facility offered in this way for the use of cable ties, the fixing accessory in accordance with the invention has other advantages.

In particular, it enables two separator angle irons to be placed in the wire cable rack, parallel to each other, defining a separate compartment in the wire cable rack which can be used to house specific electric cables, in particular cables which must be protected by a metallic shield, and this compartment is where appropriate adapted to be closed by a lid.

The fixing accessory in accordance with the invention can also be used with suspension members from which the assembly is suspended or brackets on which the assembly is supported.

Other feasible applications include its use to fix light fittings under the wire cable rack; it also facilitates the installation of systems of orientable rollers to facilitate installing the cables, before fixing them in place, by minimizing the forces required to pull the cables, especially at corner, Tee, cruciform or other intersections.

The features and advantages of the invention will emerge further from the following description which is given by way of example with reference to the accompanying diagrammatic drawings, in which:

FIG. 5 is a perspective view derived from that of FIG. 2 and showing only the fixing accessory of the invention;

FIG. 6 is a bottom view of the fixing accessory of the invention, as seen in the direction of the arrow VI in FIG. 5;

FIG. 7 is a view in longitudinal section derived from that of FIG. 3, showing the fitting of the accessory in accordance with the invention to the wire cable rack to which it is fitted;

Figure 1:
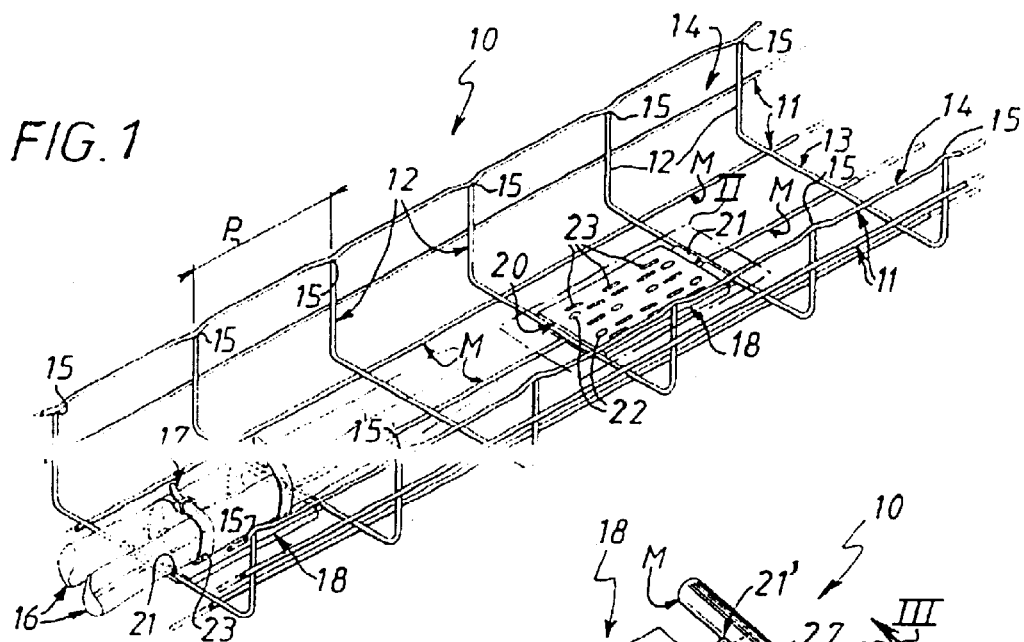
FIG. 1 is a perspective view of a wire cable rack equipped with fixing accessories in accordance with the invention.
Figure 2:
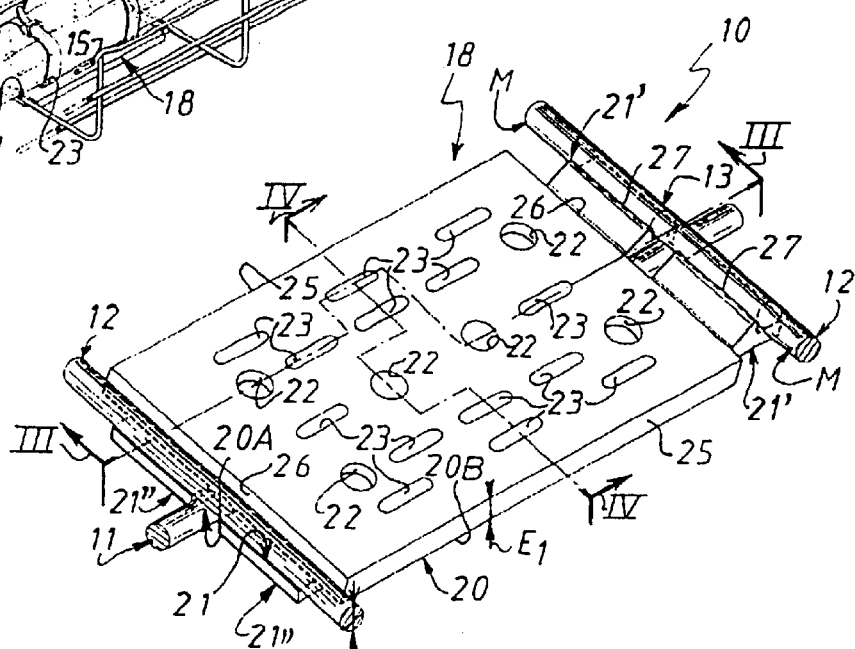
FIG. 2 shows the detail II from FIG. 1 to a larger scale.
Figure 3:
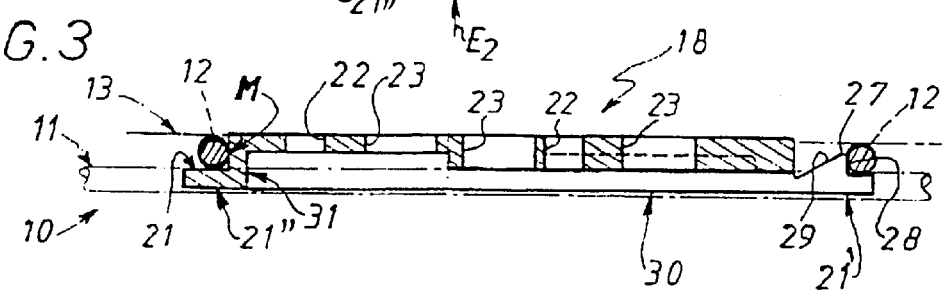
FIG. 3 is a view of a branch accessory in accordance with the invention in longitudinal section taken along the broken line III—III in FIG. 2.
Figure 4:
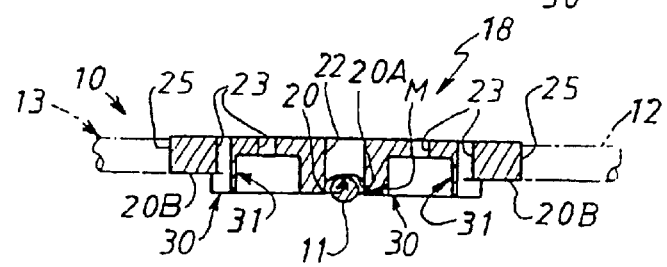
FIG. 4 is a view of the same fixing accessory in cross section taken along the broken line IV—IV in FIG. 2.

As shown in the figures, the overall aim is to equip a wire cable rack 10.

As is well known in the art, the wire cable rack 10 includes meshed wires 11, 12 of two different types, namely, longitudinal wires 11 which run longitudinally in a rectilinear or substantially rectilinear manner throughout its length and, at a regular pitch P along the longitudinal wires 11 and appropriately attached thereto, U-shaped transverse wires 12, the combination forming, in the manner of trunking, three panels 13, 14, namely a bottom panel 13 and two side panels 14.

In practice the wires 11, 12 are metal wires, to be more precise steel wires, and they are welded to each other when they cross over. The design is such that the wires 11, 12 cross at different levels.

In practice the longitudinal wires 11 are at a lower level and the transverse wires 12 at a higher level. In other words, the longitudinal wires 11 are on the outside of the transverse wires 12.

In the embodiment shown, all the wires 11, 12 are round wires.

In other words, they all have a circular cross section.

As shown here, for example, they are all the same diameter, but this is not necessarily always the case.

In the embodiment shown, the bottom panel 13 consists of three longitudinal wires 11, namely a median longitudinal wire 11 and two lateral longitudinal wires 11 equidistant from the median longitudinal wire 11, and at each pitch P the longitudinal wires 11 delimit, with the corresponding transverse wires 12, two side-by-side meshes M which are both the same size and have a rectangular contour. However, the number of longitudinal wires 11 in the bottom panel 13 and therefore the number of meshes M that they form at each pitch P can be different.

In the embodiment shown, each of the side panels 14 consists of only two longitudinal wires 11, namely an intermediate longitudinal wire 11 substantially at mid-height and an edge longitudinal wire 11. However, the number of longitudinal wires 11 can be different. In particular, like the bottom panel 13, the side panels 14 can form meshes the same size as the meshes M of the bottom panel 13 or a different size.

In the embodiment shown, the edge longitudinal wire 11 of the side panels 14 has undulations 15 spaced at the pitch P at which it is butted against the transverse wires 12, but this is not necessarily always the case.

As shown in FIG. 1, the wire cable rack 10 is adapted to support, house and protect electric cables 16 and fixing members, which in this example are cable ties 17, used to hold the cables in place.

In the embodiment shown, the electric cables 16 run along the bottom panel 13.

In accordance with the invention, the wire cable rack 10 is locally equipped, on any of its panels 13, 14, and here, in the embodiment shown, on its bottom panel 13, with at least one accessory 18, referred to herein as fixing accessory, including, as described in more detail below, attachment means 20, 21 by means of which it is fastened to the panel 13, 14 to which it is fitted, here the bottom panel 13, and at least one hole 22, 23 which passes completely through it and by means of which it is adapted to receive a fixing member of any kind, for example, in the case of a hole 23, a cable tie 17.

Of course, the wire cable rack 10 can be equipped with a plurality of fixing accessories 18, at least some of which are aligned and spaced along its length.

FIG. 1 therefore shows two fixing accessories 18 aligned with each other and in the middle of the bottom panel 13.

All the fixing accessories 18 used are preferably identical to each other.

Thus only one of them is described here.

In the embodiment shown, the fixing accessory 18 is in the general form of a plate and, like the meshes M of the wires 11, 12, it has a rectangular contour.

To constitute its attachment means 20, 21, the fixing accessory 18 in accordance with the invention has, in the embodiment shown, and in a cruciform arrangement, a first attachment surface 20 which bears on at least one outside wire, and thus in this example on a longitudinal wire 11, and a second attachment surface 21 which faces toward the first attachment surface 20 and which is engaged under at least two inside wires, and therefore in this example two transverse wires 12.

In the embodiment shown in FIGS. 1 to 7, the fixing accessory 18 in accordance with the invention straddles a longitudinal wire 11 and each of its halves extends over one of the meshes M between which the wire lies.

Accordingly, its first attachment surface 20 includes a groove 20A recessed into the bottom of its lower surface, parallel to its longitudinal edges 25.

Figure 8:
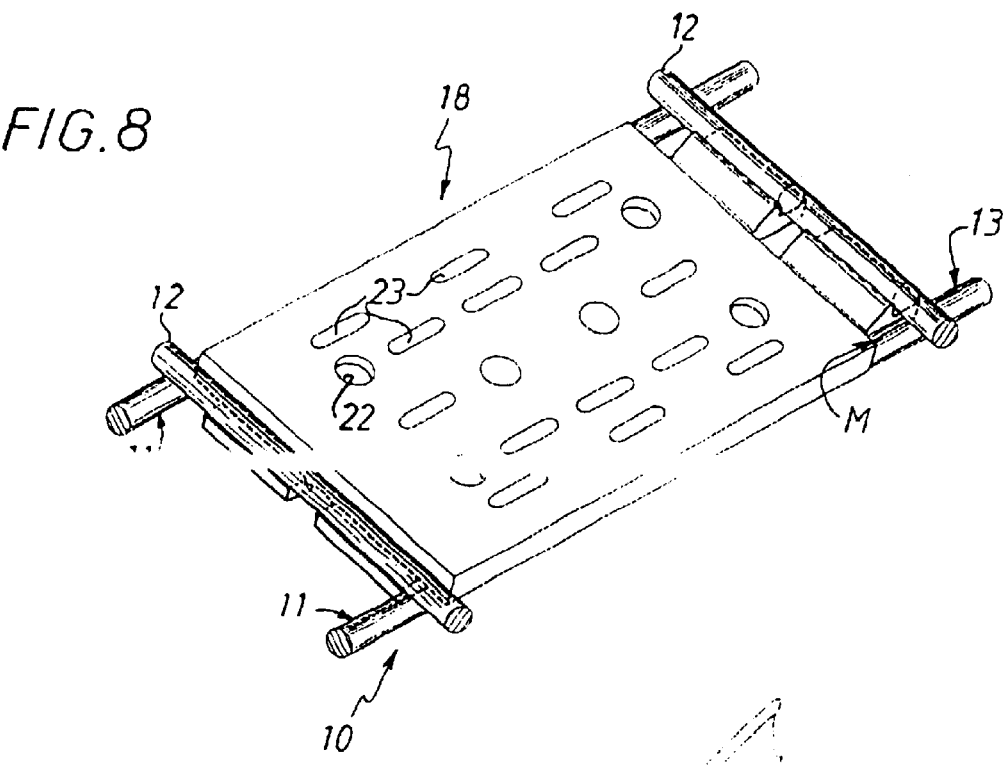
FIG. 8 is a perspective view analogous to that of FIG. 2 and relating to a variant location of the fixing accessory of the invention.

However, in the embodiment shown in FIG. 8, the fixing accessory 18 of the invention completely fills a mesh M.

Accordingly, its first attachment surface 20 includes two parallel shoulders 20B extending along respective opposite edges 25, here along its longitudinal edges.

In the embodiment shown, these two shoulders 20B on the first attachment surface 20 are in practice formed directly by the longitudinal edges 25 of the fixing accessory 18, to be more precise by their lower surface.

In the embodiment shown, the second attachment surface 21 of the fixing accessory 18 in accordance with the invention is divided into at least two lugs 21', 21" which project from its respective opposite edges 26, in this example its transverse edges.

The lug 21' on one of the edges 26 concerned is elastically deformable and has a transverse bead 27 projecting from its upper surface.

The bead 27 preferably has asymmetric flanks 28, 29, the flank 28 facing outward being stiffer than the flank 29 facing inward.

As shown here, for example, the flank 28 facing outward is upright.

The lug 21" on the other edge 26 concerned of the fixing accessory 18 of the invention can be relatively rigid, if required.

In the embodiment shown, there are two parallel lugs 21', 21" on each edge 26 of the fixing accessory 18 of the invention, i.e. on each of its transverse edges.

The groove 20A which is part of the first attachment surface 20 therefore lies between the lugs 21', 21" into which the second attachment surface 21 is thus divided.

In the embodiment shown, the lugs 21', 21" are formed by the ends of ribs 30 projecting from the lower surface of the fixing accessory of the invention.

For example, the ribs 30 extend the entire length of the fixing accessory 18 of the invention and project longitudinally from each end thereof.

The groove 20A which is part of the first attachment surface 20 is delimited between them.

In the embodiment shown, each of the ribs 30 incorporates an opening 31 to reduce the weight of the assembly.

It follows from the foregoing description that the width of the fixing accessory 18 of the invention, as measured parallel to its transverse edges 26, is slightly greater than that of the meshes M of the wires 11, 12 and that its length as measured parallel to its longitudinal edges 25 is slightly less than that of the meshes M.

The width and the length of the meshes M of the wires 11, 12, are to be understood as the distances between the axes of adjacent wires 11, 12 of the corresponding same type.

In the embodiment shown, the fixing accessory 18 of the invention includes at least two holes 22, 23 of different types, namely at least one circular hole 22 and at least one elongate slot 23.

There are preferably a plurality of holes 22 and a plurality of slots 23.

For example, the various holes 22 and slots 23 are arranged in rows parallel to the longitudinal edges 25.

In the embodiment shown, there are five such rows of holes 22 and slots 23.

As shown here, for example, the central row, which extends along the mid-line of the fixing accessory 18 of the invention, has two holes 22 in its central area and a slot 23 at each end.

As shown here, for example, the intermediate rows include three slots 23 in their central area and a hole 22 at each end.

As shown here, for example, the lateral rows include only slots 23.

In practice, all the slots 23 are elongate parallel to the longitudinal edges 25.

In the embodiment shown, the slots 23 of the lateral rows encroach at least partly on the ribs 30, to form the shoulders 20B.

The fixing accessory 18 of the invention so constituted can be made from a synthetic material, for example.

It can be installed in the following manner, for example.

Initially, and as shown diagrammatically in chain-dotted line in FIG. 7, it is offered up slantwise with its lugs 21' under a transverse wire 12 and, when in contact with the wire, it is swung into the plane of the panel 13, 14 to be equipped, as shown by the arrow F1 in FIG. 7.

It is designed so that the lugs 21" then move past the opposite transverse wire 12 without interfering with it.

When, at the end of this swinging movement, as shown in FIGS. 1 to 7, the fixing accessory 18 of the extension straddles a longitudinal wire 11, with its lugs 21', 21" on either side thereof, the bottom of its groove 20A rests against the longitudinal wire 11 (see FIGS. 2 and 3) and each half lies in one of the two corresponding meshes of the panel 13, 14 concerned.

If, as an alternative to this, and as shown in FIG. 8, the fixing accessory 18 of the invention extends between two longitudinal wires 11, its shoulder rests against the wires at the end of this swinging movement, covering at least part, and in practice the greater part, of the corresponding mesh of the panel 13, 14 concerned.

In either case, all that remains is to slide it along the longitudinal wire(s) 11 concerned in the direction of the arrow F2 in FIG. 7 until it abuts, and its lugs 21" catch on, the opposite transverse wire 12.

In doing so, the bead 27 of the lugs 21' elastically passes over the other transverse wire 12, which advantageously assures releasable locking of the assembly to the wire cable rack 10.

However, the fixing accessory 18 of the invention can be demounted by a process which is the opposite to that just described, with the result that the accessory is advantageously removable.

By design, the fixing accessory 18 of the invention preferably has, as shown here, a thickness E1 measured at the location of the plate that it forms at most equal to the thickness E2 of the wires 11, 12 of the wire cable rack 10, the thickness E2 of the wires 11, 12 being in practice their diameter.

Accordingly, the fixing accessory 18 of the invention advantageously lies at the same level as the inside wires 11, 12, i.e. at the same level as the transverse wires 12 in the embodiment shown.

All that is required to provide a seating for the electric cables 16 is to fit fixing accessories 18 of this kind from place to place along the cables.

To hold the electric cables 16 in place, all that remains is to clamp the electric cables 16 at each fixing accessory 18 using one or more cable ties 17 passing through slots 23 of the fixing accessory 18 in conjunction with the fixing accessory 18.

Figure 9:
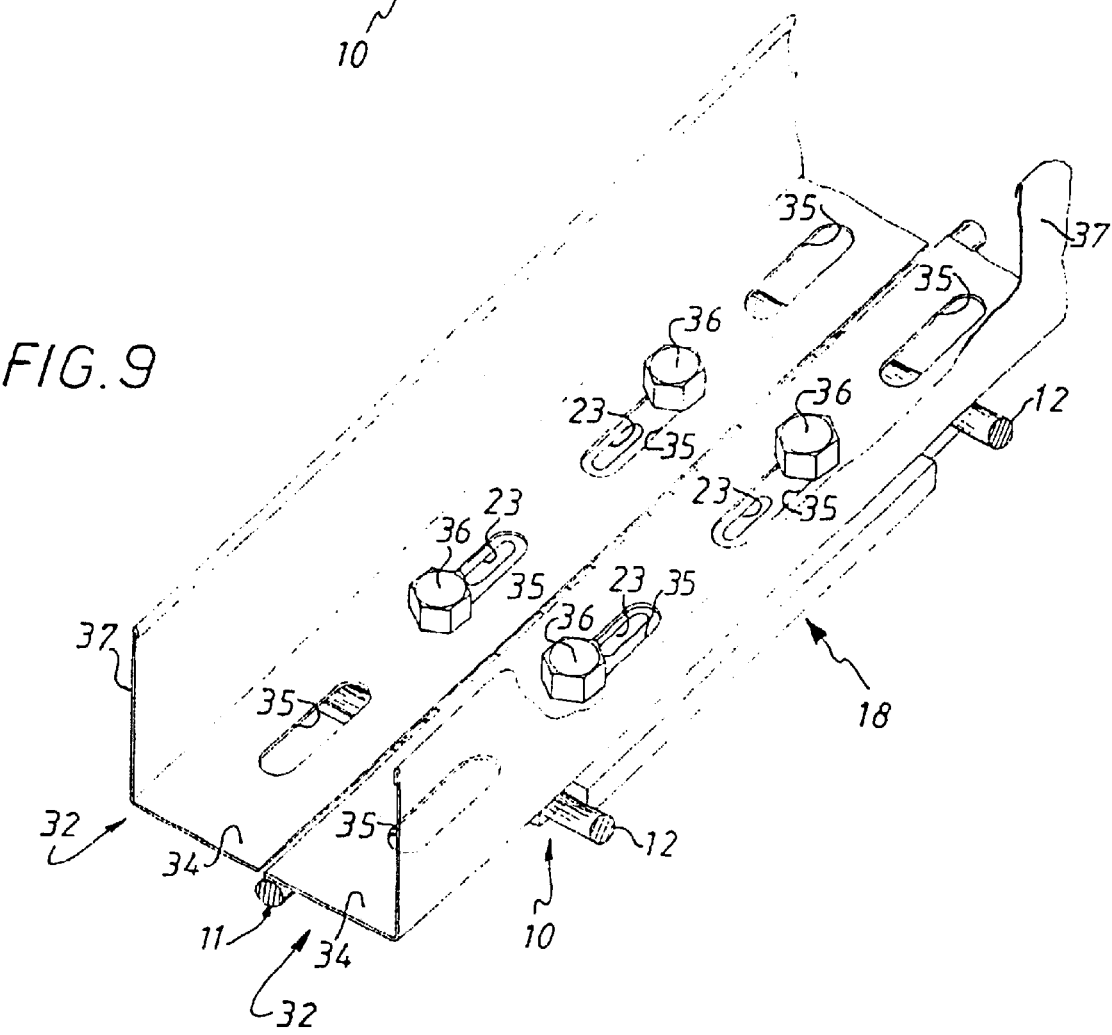
FIG. 9 is a locally cut away perspective view, also analogous to that of FIG. 2, showing another application of the fixing accessory.

In the application shown in FIG. 9, and as shown in that figure for one of the fixing accessories 18 employed, the accessories conjointly carry at least one angle iron 32.

As shown here, they preferably conjointly carry two parallel angle irons 32 which face toward each other and conjointly define a compartment which is inside the wire cable rack 10 and runs along its length.

In the embodiment shown, each of the angle irons 32 includes a fixing flange 34 which has regularly spaced longitudinally elongate slots 35 through which a fixing member, here a bolt 36, is passed.

Each of the angle irons 32 also includes a free flange 37 in which there are no holes in the embodiment shown.

If required, the angle irons 32 can be made of metal, to form a shield.

For attaching them to the wire cable rack 10, they are fixed by bolts 36 to fixing accessories 18 equipping the wire cable rack 10 in accordance with the invention, using the holes 22 in the fixing accessories 18.

As shown here, the length of the slots 35 is preferably sufficient for them to leave access to the slot 23 of the fixing accessory 18 immediately contiguous to the hole 22 concerned, despite the presence of the bolt 36.

Of course, the present invention is not limited to the embodiments and/or applications shown, but encompasses any variant execution, in particular with regard to the nature and/or the arrangement and/or the number of holes provided on the fixing accessory in accordance with the invention.

Also, instead of being attached to the bottom panel of the wire cable rack to which it is fitted, the fixing accessory in accordance with the invention can be attached to either side panel thereof.

What is claimed is:

1. Fixing accessory fixed locally to a wire cable rack of the kind including meshed wires (11, 12) of two different types, namely, longitudinal wires (11) which run longitudinally throughout its length and, spaced along the longitudinal wires (11) and appropriately attached thereto, U-shaped transverse wires (12), the combination globally forming, in the manner of trunking, three panels (13, 14) namely a bottom panel (13) and two side panels (14), said fixing accessory (18) being adapted to be mounted on any panel (13, 14) and including attachment means (20, 21) attaching the fixing accessory to the panel (13, 14) to which it is fitted and at least one hole (22, 23) which passes completely through it and which is adapted to receive a fixing member of any kind, characterized in that the wires (11, 12) cross at different levels and the fixing accessory (18) has, in a cruciform arrangement, adapted to constitute its attachment means (20, 21), a first attachment surface (20), which bears on at least one outside wire (11), and a second attachment surface (21), which faces toward the first attachment surface (20) and is engaged under at least two inside wires (12), said at least one outside wire (11) being transverse to said at least two inside wires (12).

2. Fixing accessory according to claim 1, characterized in that the first attachment surface (20) includes a groove (20A) recessed into a middle area of the lower surface of the fixing accessory (18).

3. Fixing accessory according to claim 2, characterized in that the second attachment surface (21) is divided into at least two lugs (21', 21") respectively projecting from two opposite edges (26) of the fixing accessory (18).

4. Fixing accessory according to claim 3, characterized in that the first attachment surface (20) includes two parallel shoulders (20B) extending along respective opposite edges (25) of the fixing accessory (18), and that the two shoulders (20B) of the first attachment surface (20) of the fixing accessory (18) are formed directly by its longitudinal edges (25).

5. Fixing accessory according to claim 3, characterized in that the lug (21') on one of the edges (26) of the fixing accessory (18) is elastically deformable and has a transverse bead (27) projecting from its upper surface.

6. Fixing accessory according to claim 3, characterized in that the two lugs (21', 21") into which the second attachment surface (21) is divided are formed by the ends of ribs (30) projecting from its lower surface.

7. Fixing accessory according to claim 3, characterized in that there are two parallel lugs (21', 21") on each of the edges (26) concerned of the fixing accessory (18).

8. Fixing accessory according to claim 7, characterized in that the groove (20A) in the first attachment surface (20) of the fixing accessory (18) lies between the lugs (21', 21") thereof into which the second attachment surface (21) is divided.

9. Fixing accessory according to claim 1, characterized in that the first attachment surface (20) includes two parallel shoulders (20B) extending along respective opposite edges (25) of the fixing accessory (18).

10. Fixing accessory according to claim 1, characterized in that it includes at least two holes (22, 23) of different types, namely at least one circular hole (22) and at least one elongate slot (23).

11. Fixing accessory according to claim 1, characterized in that it is in the general form of a plate.

12. Fixing accessory according to claim 1, characterized in that it is made of a synthetic material.

13. Fixing accessory according to claim 1, which has a thickness (E1) not less than that (E2) of the wires (11, 12).

14. Fixing accessory according to claim 1, which has a rectangular contour.

15. Fixing accessory according to claim 1, which is removable from said wire cable rack.

16. Fixing accessory according to claim 1, there being a plurality of said fixing accessories spaced along a length of said rack.

17. Fixing accessory according to claim 16, wherein said plural fixing accessories conjointly caring at least one angle iron (32).

* * * * *